United States Patent [19]
Grandadam

[11] 3,895,075
[45] July 15, 1975

[54] 2,5-DICHLORO-1-(3'-CHLORO-2'-BUTENYLOXY)-BENZENE

[75] Inventor: Jean Andre Grandadam, Saint-Maur des Fosses, France

[73] Assignee: Roussel Uclaf, Paris, France

[22] Filed: Apr. 17, 1973

[21] Appl. No.: 351,828

[30] Foreign Application Priority Data
Apr. 21, 1972 France .............................. 72.14117

[52] U.S. Cl. .............................. 260/612 R; 424/340
[51] Int. Cl. ........................ C07c 43/14; C07c 43/20
[58] Field of Search .................................. 260/612 R

[56] References Cited
UNITED STATES PATENTS
2,501,896   3/1950   Graenacher et al. ........... 260/612 R OTHER PUBLICATIONS
Bunina–Krivorukova et al., "J. of Org. Chem. of USSR," Vol. 5, p. 1479 (1969).

*Primary Examiner*—Donald G. Daus
*Assistant Examiner*—D. B. Springer
*Attorney, Agent, or Firm*—Hammond & Littell

[57] ABSTRACT

A novel compound of the formula

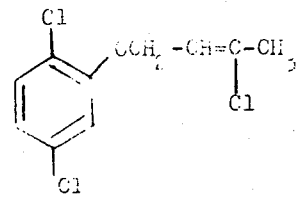

in the form of its E isomer or Z isomer or mixtures thereof which is useful as an additive to domestic animal feed, particularly for cattle and fowl.

4 Claims, No Drawings

2,5-DICHLORO-1-(3'-CHLORO-2'-BUTENYLOXY)-BENZENE

OBJECTS OF THE INVENTION

It is an object of the invention to provide 2,5-dichloro-1-(3'-chloro-2'-butenyloxy)-benzene in its isomer E or Z form or a mixture thereof.

It is another object of the invention to provide an improved animal feed.

It is an additional object of the invention to provide an improved method of increasing domestic animal growth.

These and other objects and advantages of the invention will become obvious from the following detailed description.

THE INVENTION

The novel ether of the invention is 2,5-dichloro-1-(3'-chloro-2'-butenyloxy)-benzene of the formula

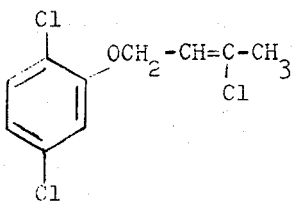

in the form of its E or Z isomers or mixtures thereof.

The said compound may be prepared by condensing 2,5-dichlorophenol with a 1-halo-3-chloro-2-butene in the presence of a basic agent to form the compound of formula I in the form of a mixture of its E and Z isomers which can then be separated by known physical methods. Preferably, 2,5-dichlorophenol is condensed with 1,3-dichloro-2-butene or 1-iodo-3-chloro-2-butene in the presence of an alkali metal hydroxide such as sodium hydroxide or potassium hydroxide. The separation of the E and Z isomers may be effected by chromatography.

Incorporation of the product into animal feed permits a better feed assimilation which advantageous property causes the animal to rapidly increase in weight. Besides, during the slaughter, it is verified that the weight of the carcasses was significantly more elevated and the classification of the carcasses was clearly better than those of the control animals. The end of the carcass design is the total weight of the animal after slaughter and removal of the viscera and phanera.

It can be concluded that the incorporation of the compounds of formula I into animal feed contributes not only to the increase in the animal weight but also increases the quality of the meat. This qualitative and quantitative increase is appreciated both by the average daily weight gain and the consummation indice. This represents the ratio between the amount of feed ingested by the animals and holding the weight of the animal.

The novel animal feed compositions of the invention are comprised of an anabolisant effective amount of a compound of formula I in association with a nutritive mixture adapted to feed growing animals. The nutritive mixture can be varied according to the animal to be fed. For the raising of pigs, the feed compositions contain proteins such as soya bean, press cake, meat flour or protein hydrolysates, lipids such as copra press cake or arachide, of carbohydrates such as molasses, of cellulose in the form of bran, of bran or of alfalfa flour and mineral salts.

For the raising of poultry, the feed compositions contain for example cereals, rice hulls, cellulose and protein enriched flours. The feed compositions generally contain 50 to 500 ppm of the ether of formula I, preferably 80 to 200 ppm for good results. In order to prepare the feed compositions containing the active compound of formula I, it is advantageous to prepare first a more concentrated mixture containing 2 to 10%, for example, of the ether of formula I and an inert solid or liquid vehicle. The concentrated mixture can then be added to the feed of the domestic animals in a sufficient amount to obtain a final concentration of 50 to 500 ppm of the ether of formula I.

In a modification of the invention, the ether of formula I is added to a veterinary medicine used to treat sick or ill animals which generally is due to frequent epizooties in industrial raisings. This permits amelioration generally and therefore obtains qualitative and quantitative results realized with other animals being raised. It can be estimated that the ethers of formula I can be prepared to be administered to sick animals which contribute to restoring or modifying the functions of the organism.

The compositions can be used to increase the holding of weight or the appetite of sick animals notably those due to microbial or parasitaric infections. It is particularly convenient to improve the general state of farm yard animals subject to coccidiosis such as chickens, turkeys or ducks. They may be administered by addition to feeds or in the form of specially prepared compositions.

The novel method of the invention for increasing the weight of domestic animals comprises feeding domestic animals with an anabolisanteffective amount of at least one compound of formula I. The compounds are preferably added to the animal feed but may also be dispensed with medications for sick animals.

In the following examples there are described several preferred embodiments to illustrate the invention. However, it should be understood that the invention is not intended to be limited to the preferred embodiments.

EXAMPLE 1

2,5-dichloro-1-(3'-chloro-2'-butenyloxy)-benzene 40.75 g of 2,5-dichlorophenol were added to a solution of 16 g of potassium hydroxide pellets in 150 ml of ethanol and then 31.25 g of 1,3-dichloro-2-butene were added thereto. The mixture was refluxed for 6 hours under a nitrogen atmosphere and with stirring and the mixture was filtered. The filtrate was concentrated to 100 ml under reduced pressure and after the addition of water and ice, the mixture was extracted with ether. The ether phase was washed with 0.1 N sodium hydroxide, then with water until the wash waters were neutral, dried over sodium sulfate and evaporated to dryness under reduced pressure to obtain 59 g of 2,5-dichloro-1-(3'-chloro-2'-butenyloxy)-benzene in the form of an oil which crystallized as colorless needles melting at 27°–30°C. The product was soluble in chloroform, ethanol, methanol and acetone and insoluble in water.

Analysis: $C_{10}H_9Cl_3O$; molecular weight = 251.54
Calculated: %C 47.75 %H 3.60 %Cl 42.30

Found: 47.9 3.7 42.1

The said product was a mixture of the E and Z isomers with 10% being isomer E and 90% being isomer Z. For separation, the raw product was chromatographed over silica and eluted with petroleum ether (Boiling point = 35°–70°C) to obtain isomer E melting at 35°C and isomer Z melting at 40°C.

RMN Spectrum:
—$CH_3$: 129.5–130.5 Hz (isomer E) and 128.5–129.5 Hz (isomer Z)
—$CH_2$: 270–277 Hz (isomer E) and 280–286 Hz (isomer Z)
—CH: 349–356 and 363 Hz (isomer E) and 340–346 and 352 Hz (isomer Z)
Aromatic H: 405–440 Hz (isomer E) and 405–440 Hz (isomer Z)

The two isomers were colorless solids soluble in most of the usual organic solvents.

EXAMPLE 2

Anaboliant activity of 2,5-dichloro-1-(3'-chloro-2'-butenyloxy)-benzene

A. Test on Pigs

The anabolisant activity of the product was determined on pigs issuing by cross-breeding Large White Landrace weighing an average 26 kg. The animals were divided into a control group receiving for 43 days only the base feed and a second group receiving for 43 days the base feed containing 100 ppm of the test compound. The base feed consisted of a mixture of barley, of white bran, of small bran, of soya bean press cake, of molasses copra press cake, of meat flour, of dehydrated alfalfa flour and of vitaminized mineral compounds with a percentage of 55% cereal, 25% of cereal refuse, 17% of press cake and 3% of concentrated vitaminized minerals. For the duration of the test (104 days), all the animals received the same feed base.

Results:

After about 43 days, the average daily gain increased by 9.5%. In spite of halting the treatment on the 43rd day, this good advantage while diminished was conserved even after about 104 days (5.5%). The classification of the carcasses of the pigs treated with the test product was better than the control animals. During the course of treatment, the consummation indice was improved 4.5% and after 104 days was still maintained at −4%. The data is reported in Tables I and II.

TABLE I

| Zootechnical Performance in course of fatting and slaughter abatage yield | Controls | Treated |
|---|---|---|
| Animals | 5 | 5 |
| Days of fatting | 104 | 104 |
| Average weight at beginning | 26.28 | 27.36 |
| Average weight after 43 days | 53.24 | 56.88 |
| Average weight after 104 days | 95.52 | 100.44 |
| Average gain in 43 days | 26.96 | 29.52 |
| Average gain in 104 days | 69.24 | 73.08 |
| Average daily gain in 43 days | 0.627 | 0.687 |
| Average daily gain in 104 days | 0.666 | 0.703 |
| Average weight of carcass | 69.60 | 73.0 |
| Classification of carcasses  B | 3 | 5 |
|                              C | 2 | 0 |

The carcasses were classified in three groups according to quality of meat; group C is the least good; group B is indicative of a good quality meat.

TABLE II

| | Groups | Feed Consumied in Kg | Weight gain in Kg | Consumption indice |
|---|---|---|---|---|
| 1st period 43 days | Control | 409.765 | 134.80 | 3.04 |
| | Treated | 427.725 | 147.60 | 2.90 |
| 2nd period 61 days | Controls | 789.835 | 211.40 | 3.74 |
| | Treated | 790.825 | 217.80 | 3.63 |
| Total Period of 104 days | Controls | 1199.600 | 346.20 | 3.47 |
| | Treated | 1218.550 | 365.40 | 3.33 |

B. Test on Chickens

The anabolisant activity was determined on male Hubbard chickens with yellow meat in a first test and with Hybro chickens with white meat in a second test. The animals were divided into a control group receiving only the base feed and a second group receiving the base feed containing 100 ppm of the test compound. The animals were kept in the test for 48 days and they were 2 weeks old at the start of the test. The results are reported in Tables III and IV.

TABLE III

HUBBARD CHICKENS

| Initial Weight in g | Age in weeks | Weekly Gain Weight in g Controls | Treated | Weekly Consummation in g Controls | Treated |
|---|---|---|---|---|---|
| Controls: 56.1 | 1 | 104.8 | 103.4 | 129.0 | 129.0 |
| Treated: 55.6 | 2 | 160.4 | 164.6 | 243.0 | 243.0 |
| | 3 | 212.5 | 216.8 | 349.5 | 357.3 |
| | 4 | 278.7 | 287.7 | 487.2 | 486.1 |
| | 5 | 326.3 | 344.7 | 626.3 | 667.4 |
| | 6 | 262.3 | 280.0 | 677.2 | 698.7 |
| | 7 | 289.8 | 318.2 | 752.5 | 787.7 |
| | 8 | 334.0 | 351.8 | 803.9 | 866.4 |
| | 9 | 300.4 | 297.7 | 876.8 | 910.0 |
| | 10 | 194.8 | 252.5 | 913.3 | 962.6 |

TABLE IV

HYBRO CHICKENS

| Initial Weight in g | Age in weeks | Weekly Gain Weight in g Controls | Treated | Weekly Consummation in g Controls | Treated |
|---|---|---|---|---|---|
| Controls: 55.2 | 1 | 94.3 | 93.6 | 125.0 | 125.0 |
| Treated: 56.2 | 2 | 145.2 | 144.7 | 250.0 | 250.0 |
| | 3 | 220.3 | 233.0 | 450.1 | 460.7 |
| | 4 | 274.2 | 292.1 | 495.4 | 511.9 |
| | 5 | 297.2 | 309.9 | 624.4 | 682.2 |
| | 6 | 311.6 | 346.2 | 769.0 | 798.7 |
| | 7 | 317.4 | 365.5 | 823.4 | 896.1 |
| | 8 | 334.1 | 346.6 | 888.0 | 960.5 |
| | 9 | 314.3 | 343.5 | 906.4 | 962.2 |
| | 10 | 260.6 | 227.6 | 970.0 | 983.2 |

Tables III and IV show that the test product provokes an important anabolisant activity in male chickens at a dose of 100 ppm.

Various modifications of the compositions and methods of the invention may be made without departing from the spirit or scope thereof and it should be understood that the invention is intended to be limited only as defined in the appended claims.

I claim:

1. A compound selected from the group consisting of E isomer, Z isomer and mixtures of E and Z isomers of 2,5-dichloro-1-(3'-chloro-2'-butenyloxy)-benzene.

2. A compound of claim 1 which is the E isomer of 2,5-dichloro-1-(3'-chloro-2'-butenyloxy)-benzene.

3. A compound of claim 1 which is the Z isomer of 2,5-dichloro-1-(3'-chloro-2'-butenyloxy)-benzene.

4. A compound of claim 1 which is a mixture of the E and Z isomers of 2,5-dichloro-1-(3'-chloro-2'-butenyloxy)-benzene.

* * * * *